(12) United States Patent
Yeo

(10) Patent No.: US 10,589,771 B2
(45) Date of Patent: Mar. 17, 2020

(54) CART WITH WHEEL THAT IS EASILY LOCKABLE AND UNLOCKABLE

(71) Applicant: Shin Dong Yeo, Daegu (KR)

(72) Inventor: Shin Dong Yeo, Daegu (KR)

(*) Notice: Subject to any disclaimer, the term of this patent is extended or adjusted under 35 U.S.C. 154(b) by 0 days.

(21) Appl. No.: 16/294,585

(22) Filed: Mar. 6, 2019

(65) Prior Publication Data

US 2019/0291766 A1   Sep. 26, 2019

(30) Foreign Application Priority Data

Mar. 21, 2018   (KR) .................. 10-2018-0032572

(51) Int. Cl.
*B62B 3/00*   (2006.01)
*B62B 5/04*   (2006.01)

(52) U.S. Cl.
CPC ............. *B62B 5/0457* (2013.01); *B62B 3/00* (2013.01); *B62B 5/0447* (2013.01)

(58) Field of Classification Search
CPC .......... B62B 3/00; B62B 3/14; B62B 5/0442; B62B 5/0433; B62B 5/0447
USPC .................... 280/47.34, 47.35, 79.11, 47.24
See application file for complete search history.

(56) References Cited

U.S. PATENT DOCUMENTS

| | | | | |
|---|---|---|---|---|
| 3,276,550 A | * | 10/1966 | Honeyman | B62B 5/04 188/29 |
| 3,422,930 A | * | 1/1969 | Barron | B62B 5/04 188/22 |
| 3,651,894 A | * | 3/1972 | Auriemma | B62B 5/04 188/19 |
| 4,819,767 A | * | 4/1989 | Laird | B62B 5/04 188/196 M |
| 4,840,388 A | * | 6/1989 | Doughty | B62B 5/04 188/19 |
| 4,976,447 A | * | 12/1990 | Batson | B62B 5/04 188/19 |
| 5,046,748 A | * | 9/1991 | Oat-Judge | A61H 3/04 188/5 |
| 5,390,942 A | * | 2/1995 | Schuster | B62B 5/04 280/19 |
| 5,460,399 A | * | 10/1995 | Baechler | B60B 37/10 188/20 |
| 5,476,275 A | * | 12/1995 | Baechler | B60B 37/10 280/47.38 |
| 5,524,731 A | * | 6/1996 | Grieg | B62B 5/04 188/19 |

(Continued)

FOREIGN PATENT DOCUMENTS

KR   10-2010-0101318 A   9/2010

*Primary Examiner* — Jeffrey J Restifo
(74) *Attorney, Agent, or Firm* — Novick, Kim & Lee, PLLC; Jae Youn Kim

(57) ABSTRACT

A cart has a wheel that is easily lockable and unlockable while being securely braked. The cart includes a platform having a wheel and on which freight is loaded, a handle bar including an inverted U shaped frame including a left frame, a right frame, and a connecting frame, a wheel locking and unlocking operation part provided on the inverted U shaped frame and configured to be pressed and elastically restored, and an operation part configured to operate by an operation of the wheel locking and unlocking operation part, and a folding operation part including a pedal provided at one end of the platform, a pedal connecting part connected to the pedal from a lower surface of the platform, and a folding operation rod supported by the pedal connecting part and configured to vertically move.

7 Claims, 16 Drawing Sheets

(56) References Cited

U.S. PATENT DOCUMENTS

| | | | | |
|---|---|---|---|---|
| 5,531,295 A * | 7/1996 | Kopman | ............... | B60T 1/04 188/17 |
| 5,722,515 A * | 3/1998 | Wyse | ............... | B60T 11/04 188/22 |
| 5,735,367 A * | 4/1998 | Brubaker | ............... | B60B 33/021 188/1.12 |
| 5,799,959 A * | 9/1998 | Krawczyk | ............... | B62B 5/04 188/1.12 |
| 5,906,383 A * | 5/1999 | Cortes | ............... | B62B 3/027 280/47.371 |
| 5,927,441 A * | 7/1999 | Luo | ............... | B62B 5/04 188/19 |
| 6,123,343 A * | 9/2000 | Nolting, Jr. | ............... | B62B 5/04 188/19 |
| 6,199,878 B1 * | 3/2001 | Masserant | ............... | B62B 3/18 188/19 |
| 6,298,949 B1 * | 10/2001 | Yang | ............... | B62B 5/0414 188/19 |
| 6,409,187 B1 * | 6/2002 | Crow, Jr. | ............... | B62B 5/04 188/20 |
| 6,481,540 B1 * | 11/2002 | Nolting, Jr. | ............... | B62B 5/0442 188/166 |
| 6,508,479 B1 * | 1/2003 | Tseng | ............... | B62B 3/007 188/21 |
| 6,752,404 B1 * | 6/2004 | Blake | ............... | B62B 5/0442 188/19 |
| 7,448,476 B2 * | 11/2008 | Otterson | ............... | B62B 5/04 188/19 |
| 7,758,055 B2 * | 7/2010 | Martinez | ............... | B62B 5/04 188/29 |
| 8,146,928 B2 * | 4/2012 | Geeslin | ............... | B62B 9/085 280/47.38 |
| 8,465,028 B2 * | 6/2013 | Wyse | ............... | B62B 5/0438 280/47.24 |
| 9,994,244 B2 * | 6/2018 | Churchvara | ............... | B62B 3/02 |
| 10,259,482 B2 * | 4/2019 | Yeo | ............... | B62B 5/0433 |
| 2008/0174081 A1 * | 7/2008 | Wu | ............... | B62B 3/02 280/47.34 |

* cited by examiner

CART WITH WHEEL THAT IS EASILY LOCKABLE AND UNLOCKABLE

CROSS-REFERENCE TO RELATED APPLICATION

This application claims priority to and the benefit of Korean Patent Application No. 10-2018-0032572, filed on Mar. 21, 2018, the disclosure of which is incorporated herein by reference in its entirety.

BACKGROUND

1. Field of the Invention

The present invention relates to a cart with a wheel that is easily lockable and unlockable while being securely braked.

2. Discussion of Related Art

In a goods carrying cart used for carrying goods in a post office, a warehouse, and the like, generally, a platform onto which articles may be loaded is provided at a lower portion of a cart main body, wheels for moving are rotatably provided at front and rear lower portions of the platform, and a handle including a "∩" shaped frame is provided at a rear portion of the platform. A cart user transfers goods within a predetermined section by rotating the front and rear wheels while pushing the handle.

However, in the case in which the above-described goods carrying cart moves and then stops while the goods are loaded thereon, since the wheels of the cart are not fixed even on the flat ground, there is a concern that, during the task of loading goods, the goods carrying cart and the goods placed thereon may be moved. Further, when attempting to perform the task of loading goods while the goods carrying cart is placed at an inclined place, there is not only a concern about accidents because the wheels of the goods carrying cart are not fixed, but also a problem in that it is not possible to perform the loading task itself.

To address these problems, a technology has been developed in which a cart is allowed to be braked easily and conveniently by a user's foot, while the cart is driven, a foot brake pedal is prevented from interfering with freight loaded on a loading plate, and, while the cart is braked, the foot brake pedal, which visually indicates a braked state to a user, is disposed at a rear side of an upper portion of the loading plate at which a handle portion, which is provided adjacent to the user, is disposed.

An example of such a technology has been disclosed in Korean Patent Publication No. 10-2010-0101318 (Date of Publication: Sep. 17, 2010).

However, in the above related art, since, in order to brake the cart, the user has to always press the foot brake pedal while placing his or her foot thereon, there is a problem in that the braking of the cart is immediately released as soon as the user removes his or her foot from the foot brake pedal for the goods loading task.

In addition, in the conventional general goods carrying cart, while an angle at which left and right frames of the handle portion including the "∩" shaped frame is provided is perpendicular with respect to the platform onto which articles may be loaded, and only an upper frame disposed at upper portions of the left and right frames of the "∩" shaped frame is formed to be inclined with respect to the left and right frames, the platform is disposed in the vicinity of the ground and thus a center of mass of the platform itself and goods placed thereon is lower than that of the upper frame in most cases. However, since the user pushes the handle from top to bottom at a slant, there is a disadvantage in that, when the user applies a pushing force to the goods carrying cart in order to move the goods carrying cart forward, since a horizontal component force of the pushing force transferred to the center of mass of the platform and goods loaded thereon of the goods carrying cart becomes smaller, a greater pushing force has to be applied in order to move the goods carrying cart onto which goods are loaded.

Furthermore, in the case of the conventional general goods carrying cart, since, when attempting to fold the handle to be parallel to an upper surface of the platform, the user has to release a device for fixing and releasing a folded state by hand and then push the handle again by hand to fold the handle to be parallel to the upper surface of the platform, there is a concern that the handle may collide with the platform and be damaged when the folding of the handle is released. In order to prevent this, the task of unlocking the folded state should be performed by one hand while the handle is held by the other hand, and the folding task should be separately performed after the folded state unlocking task is performed. Therefore, there is an inconvenience of having to use both hands during the folded state unlocking and folding tasks.

SUMMARY OF THE INVENTION

One aspect of the present invention provides a cart with a wheel that is easily lockable and unlockable in which the wheel of the cart is easily locked and unlocked while being securely braked.

Another aspect of the present invention provides a cart with a wheel that is easily lockable and unlockable in which the cart may be used while the wheel of the cart is kept locked and unlocked when necessary.

Still another aspect of the present invention provides a cart with a wheel that is easily lockable and unlockable in which, even when a user applies a small pushing force to the cart, a horizontal component force of the force pushing the cart becomes large, and thus the cart onto which goods are loaded may be moved even with a small force.

Yet another aspect of the present invention provides a cart with a wheel that is easily lockable and unlockable in which, during tasks of unlocking a folded state of a handle and folding the handle, a hand and a foot are alternately used such that efficiency of the tasks is improved.

To achieve the above aspects, a cart with a wheel that is easily lockable and unlockable according to the present invention includes a platform having a wheel including therein a fixing piece in which a plurality of recessed grooves are formed along an inner circumference thereon and on which freight is loaded, a handle bar including a "∩" shaped frame including a left frame, a right frame, and a connecting frame, of which rearward rotation is limited by a rearward rotation limiting part provided at a rear side of an upper surface of the platform, a wheel locking and unlocking operation part provided on the "∩" shaped frame and configured to be pressed and elastically restored, and an operation part configured to operate by an operation of the wheel locking and unlocking operation part, and a folding operation part including a pedal provided at one end of the platform, a pedal connecting part connected to the pedal from a lower surface of the platform, and a folding operation rod supported by the pedal connecting part and configured to vertically move, wherein the operation part of the handle bar includes a first operation part disposed inside the left frame and the right frame and configured to vertically operate by an operation of pressing and releasing the wheel locking and unlocking operation part, a second operation part coupled to a lower end of the first operation part and having a recessed groove formed at a lower end portion thereof, a third operation part disposed at the lower surface of the platform and configured to rotate or be elastically restored, in linkage with an operation of the second operation part, about a hinge provided at a rotary plate provided at the lower surface of the platform, and a fourth operation part connected to the third operation part via the rotary plate and configured to be inserted and withdrawn into and from one of the plurality of recessed grooves of the wheel to cause the wheel to be locked and unlocked.

In the cart with a wheel that is easily lockable and unlockable according to the present invention, the left frame and the right frame may be provided upward at an angle in the range of 100° to 110° with respect to the upper surface of the platform while the pedal does not operate.

In the cart with a wheel that is easily lockable and unlockable according to the present invention, the elastic restoration of the wheel locking and unlocking operation part may be performed by a spring seating ring fitted to inner sides of upper ends of the left frame and the right frame and a spring provided between protrusions protruding downward from an inner surface of an upper end portion of the wheel locking and unlocking operation part.

In the cart with a wheel that is easily lockable and unlockable according to the present invention, a spring may be provided between the third operation part and the platform, and the elastic restoration of the third operation part may be performed by the spring.

The cart with a wheel that is easily lockable and unlockable according to the present invention may include an extension connected to the pedal connecting part and disposed between the lower surface of the platform and the third operation part so that, while the pedal is pressed, the extension allows the third operation part to rotate about the hinge.

In the cart with a wheel that is easily lockable and unlockable according to the present invention, the third operation part may include a fixing part coupled and fixed to the third operation part while surrounding the third operation part at a portion of the third operation part intersecting with an extension of a lower side of the second operation part and may include an inserting/withdrawing part connected to the fixing part and configured to remain inserted into a recessed groove of the second operation part at ordinary times and be inserted and withdrawn into and from the recessed groove of the second operation part during the operation of pressing and releasing the pedal.

In the cart with a wheel that is easily lockable and unlockable according to the present invention, a wheel locked and unlocked state maintaining part having a shape in which a concave recess is formed at the center of an upper surface thereof, a key groove is formed at a bottom surface of the recess, and a transverse cross-section corresponding to a transverse cross-section of the key groove is disposed at the bottom surface of the recess may be disposed at the wheel locking and unlocking operation part, the connecting frame may have a screw groove formed therein, the wheel locked and unlocked state maintaining part may have a bolt formed at a lower side thereof, and the bolt may pass through a hole in the wheel locking and unlocking operation part to be screw-fastened to the screw groove and may be released therefrom.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an embodiment of the present invention for solving the above-mentioned problems will be described with reference to the accompanying drawings.

Figure 1:
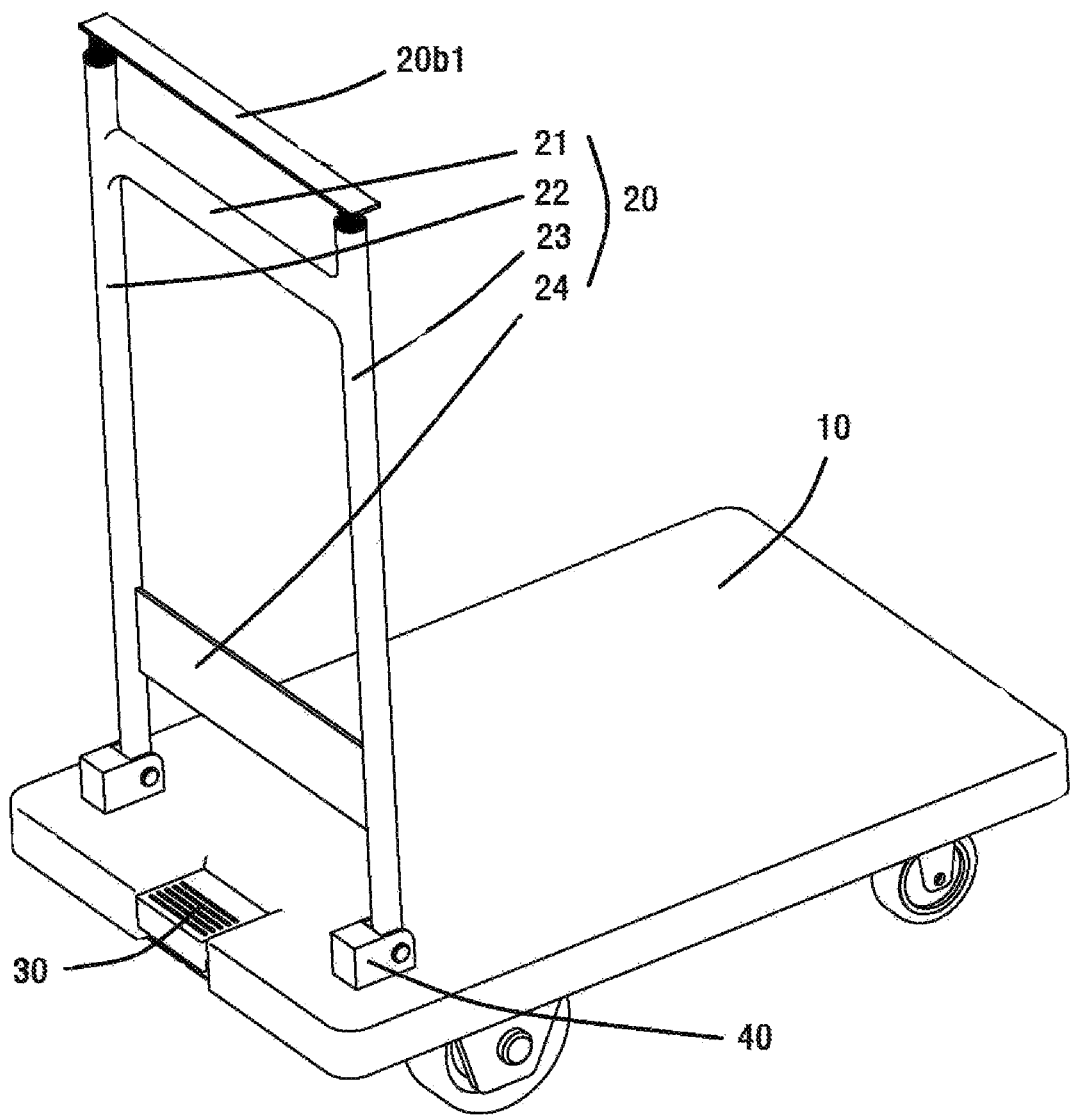
FIG. 1 is a perspective view of a cart with a wheel that is easily lockable and unlockable according to an exemplary embodiment of the present invention, the perspective view showing a state in which a wheel locking and unlocking operation part is removed.
Figure 2:
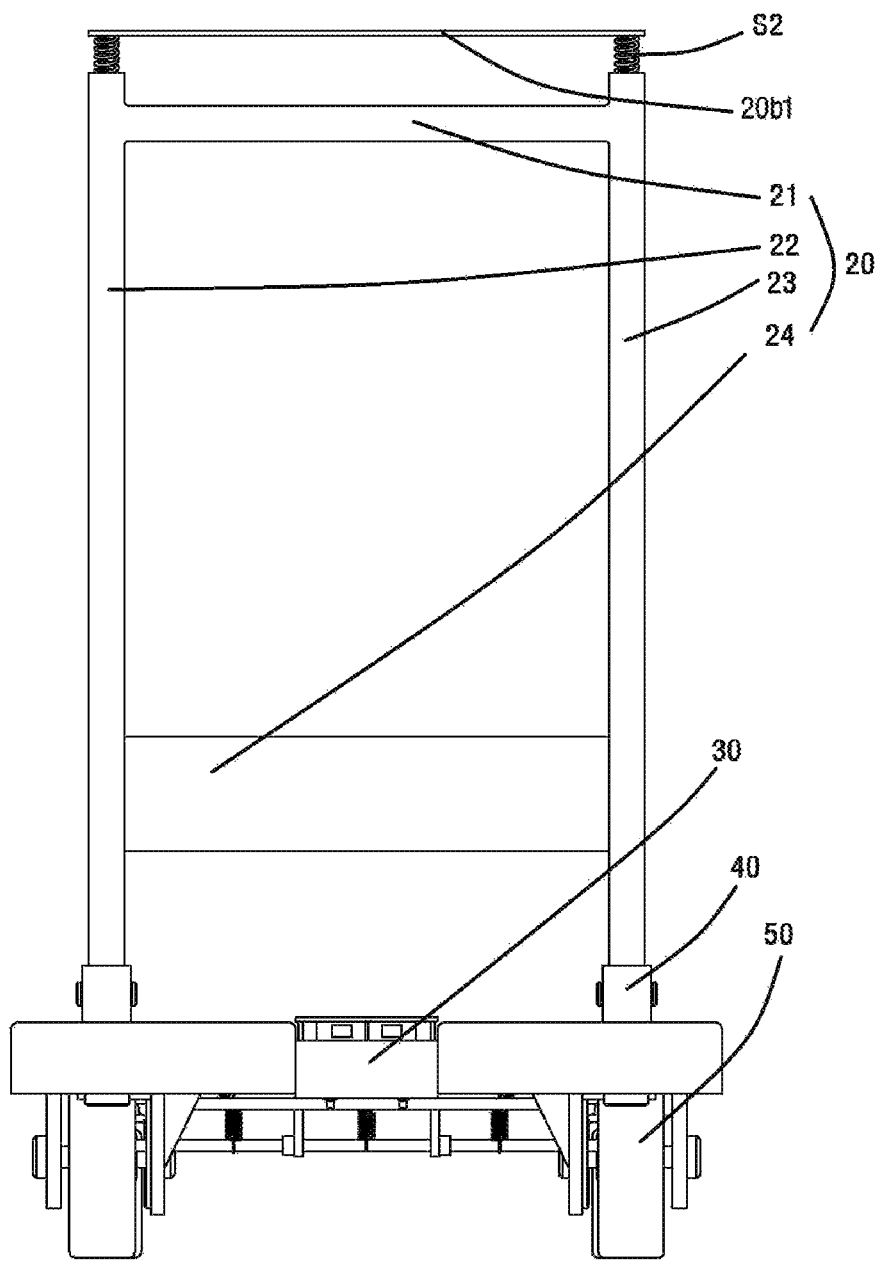
FIG. 2 is a rear view of FIG. 1.
Figure 3:
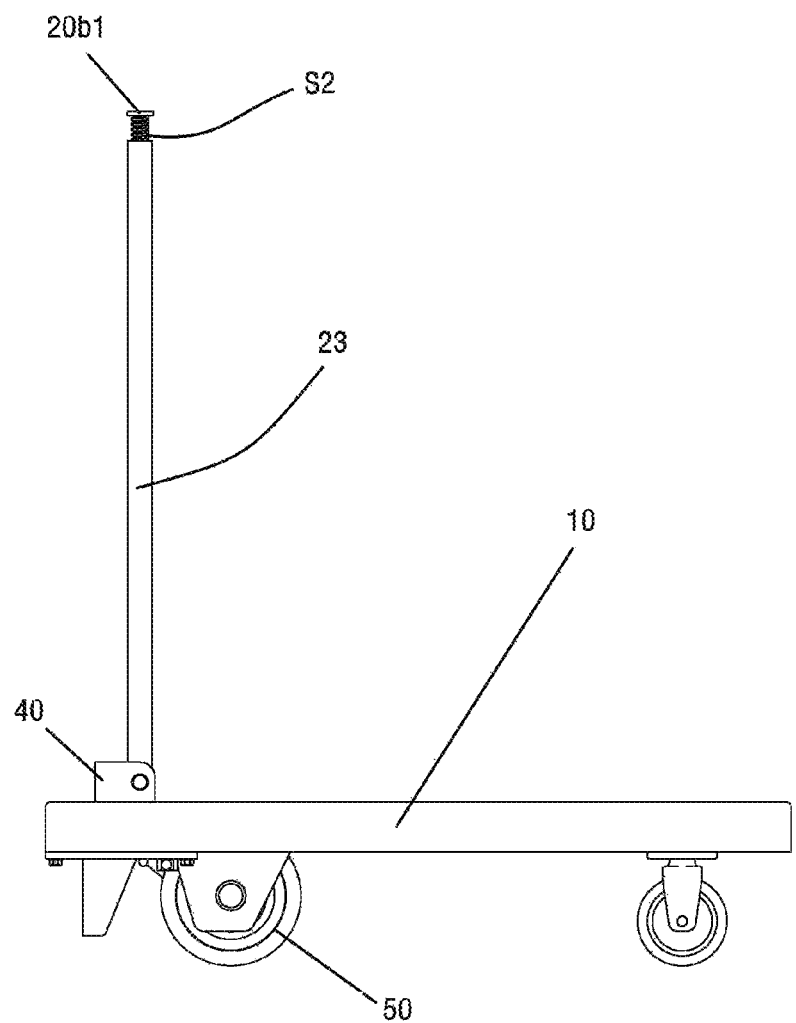
FIG. 3 is a right side view of FIG. 1.
Figure 4:
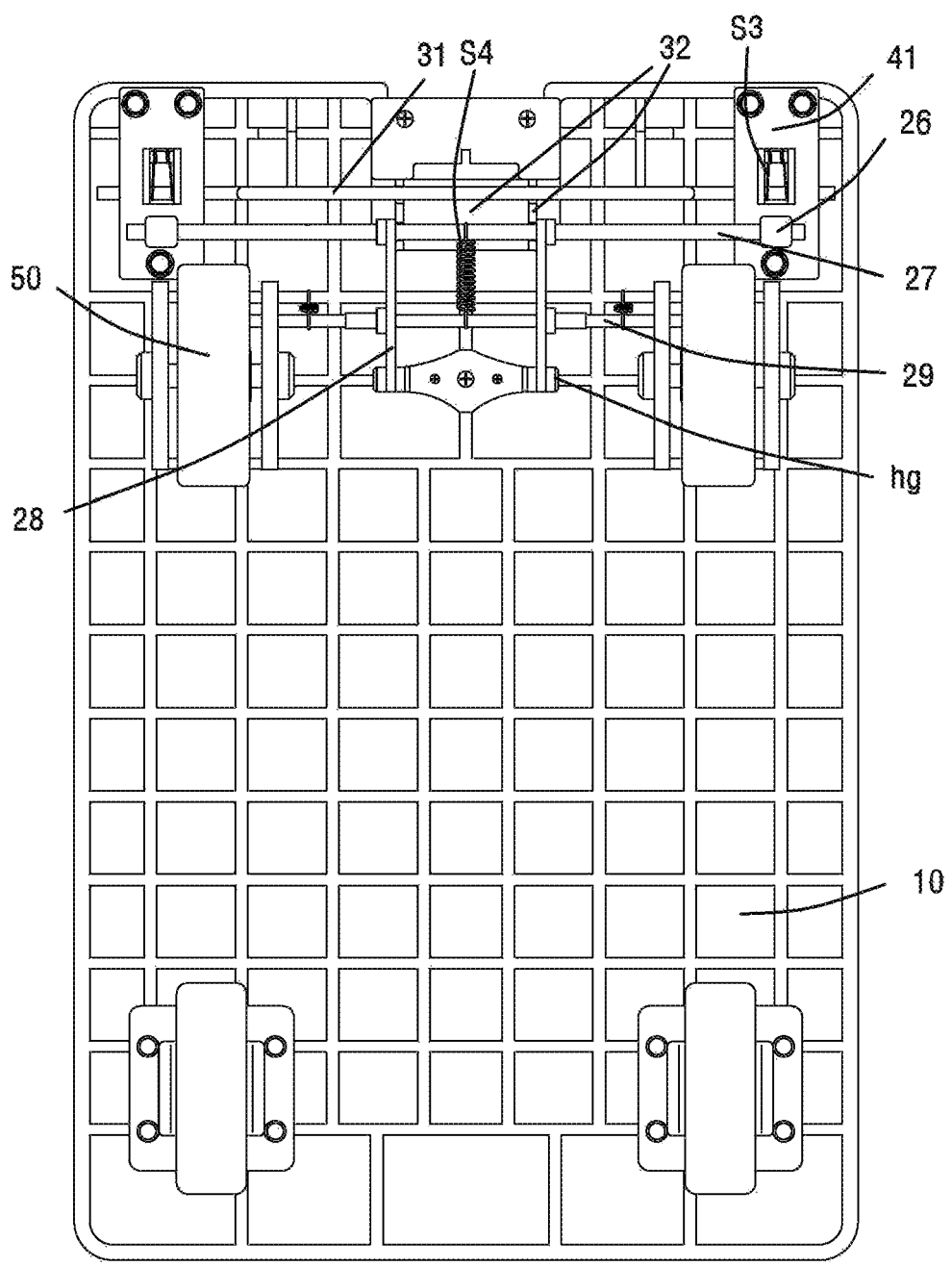
FIG. 4 is a bottom view of FIG. 1.

FIG. 1 is a perspective view of a cart with a wheel that is easily lockable and unlockable according to an exemplary embodiment of the present invention, the perspective view showing a state in which a wheel locking and unlocking operation part is removed. FIG. 2 is a rear view of FIG. 1, FIG. 3 is a right side view of FIG. 1, and FIG. 4 is a bottom view of FIG. 1.

As seen in FIGS. 1 to 4, the cart with a wheel that is easily lockable and unlockable according to the present invention includes a platform 10, a handle bar 20, and a folding operation part.

Figure 5:
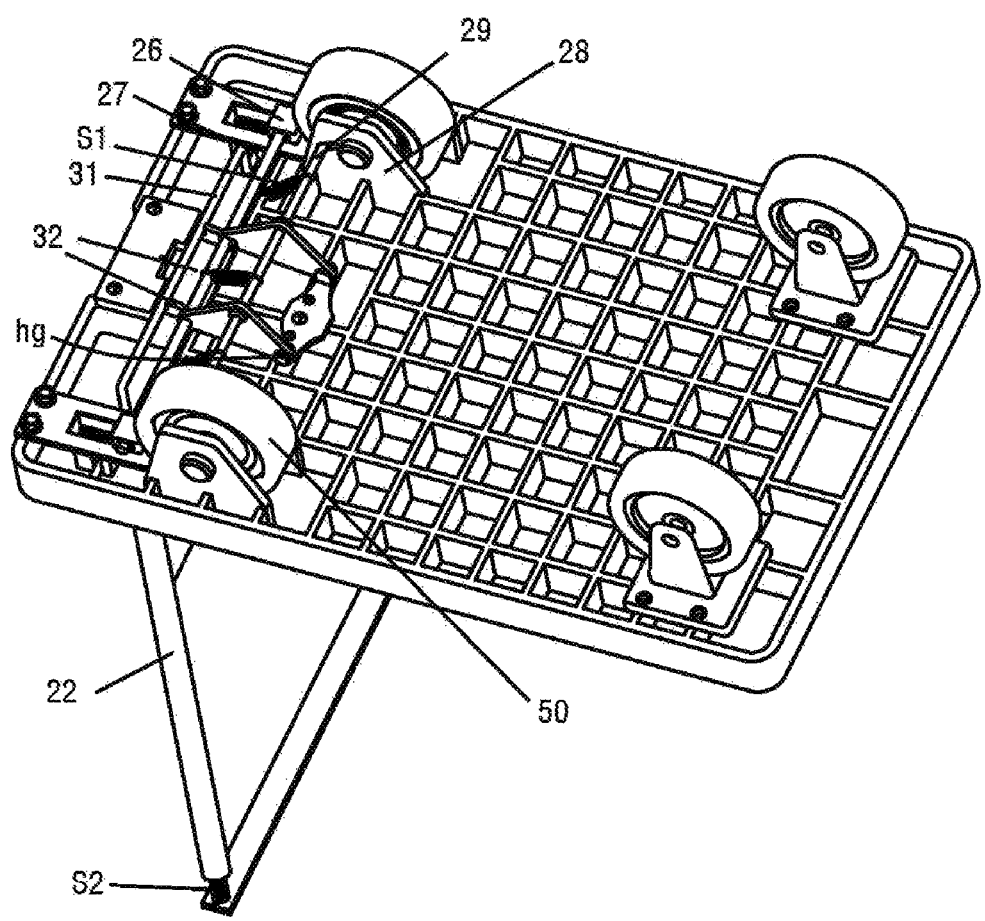
FIG. 5 is a perspective view of the cart of FIG. 1 that is viewed at a slant from the bottom.
Figure 6:
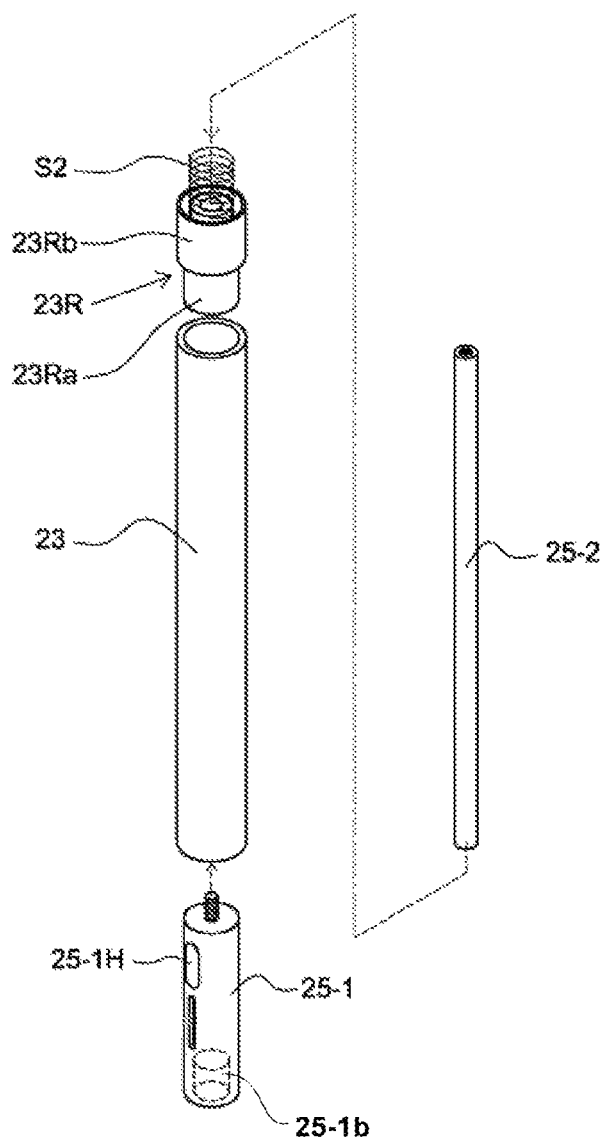
FIG. 6 is an exploded perspective view of first and second operation parts of an operation part of a handle bar.
Figure 7:
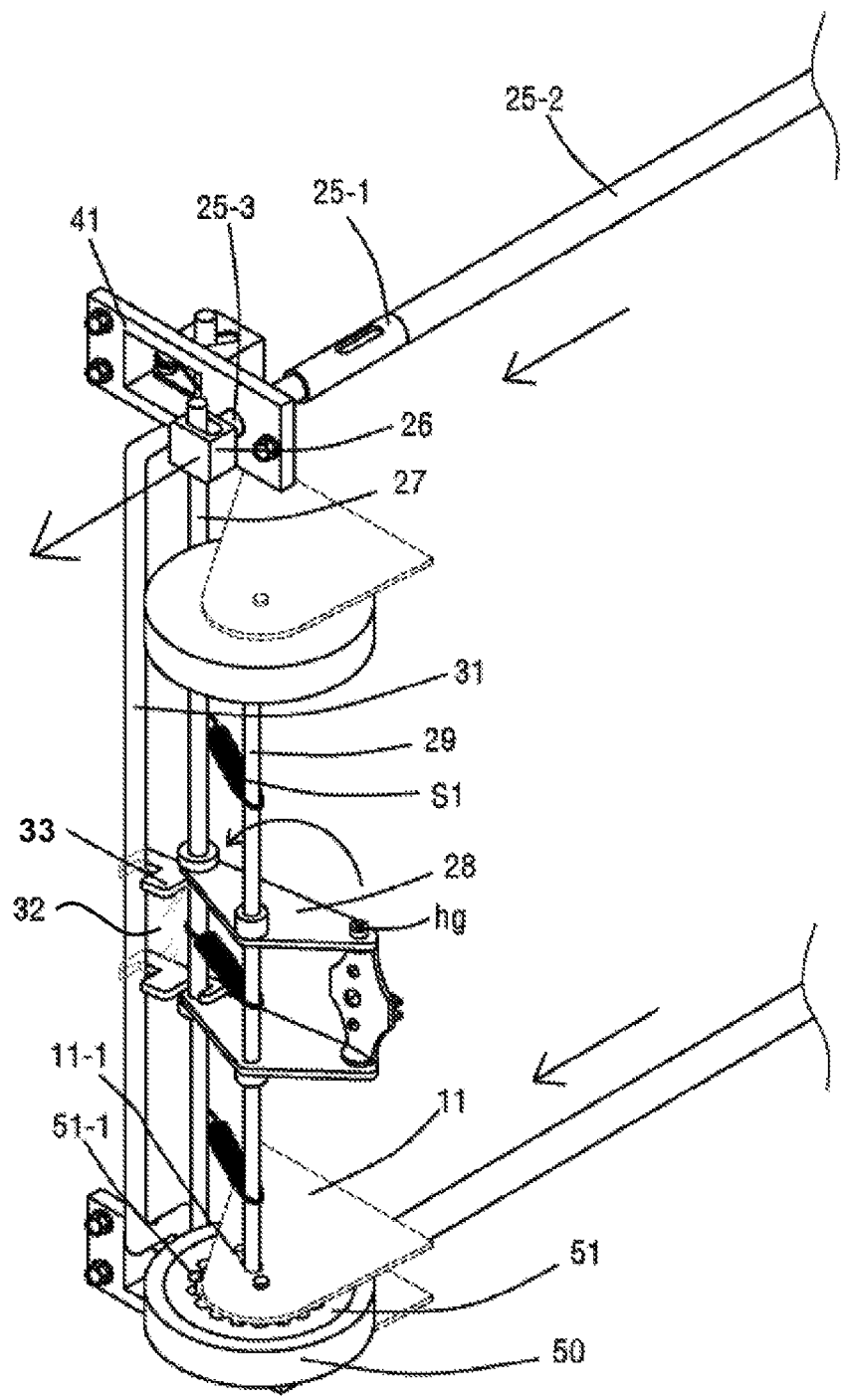
FIG. 7 is a perspective view illustrating a state in which an inserting/withdrawing part has moved downward while the wheel locking and unlocking operation part is pressed, the perspective view showing a state in which a platform is removed from FIG. 5.
Figure 8:
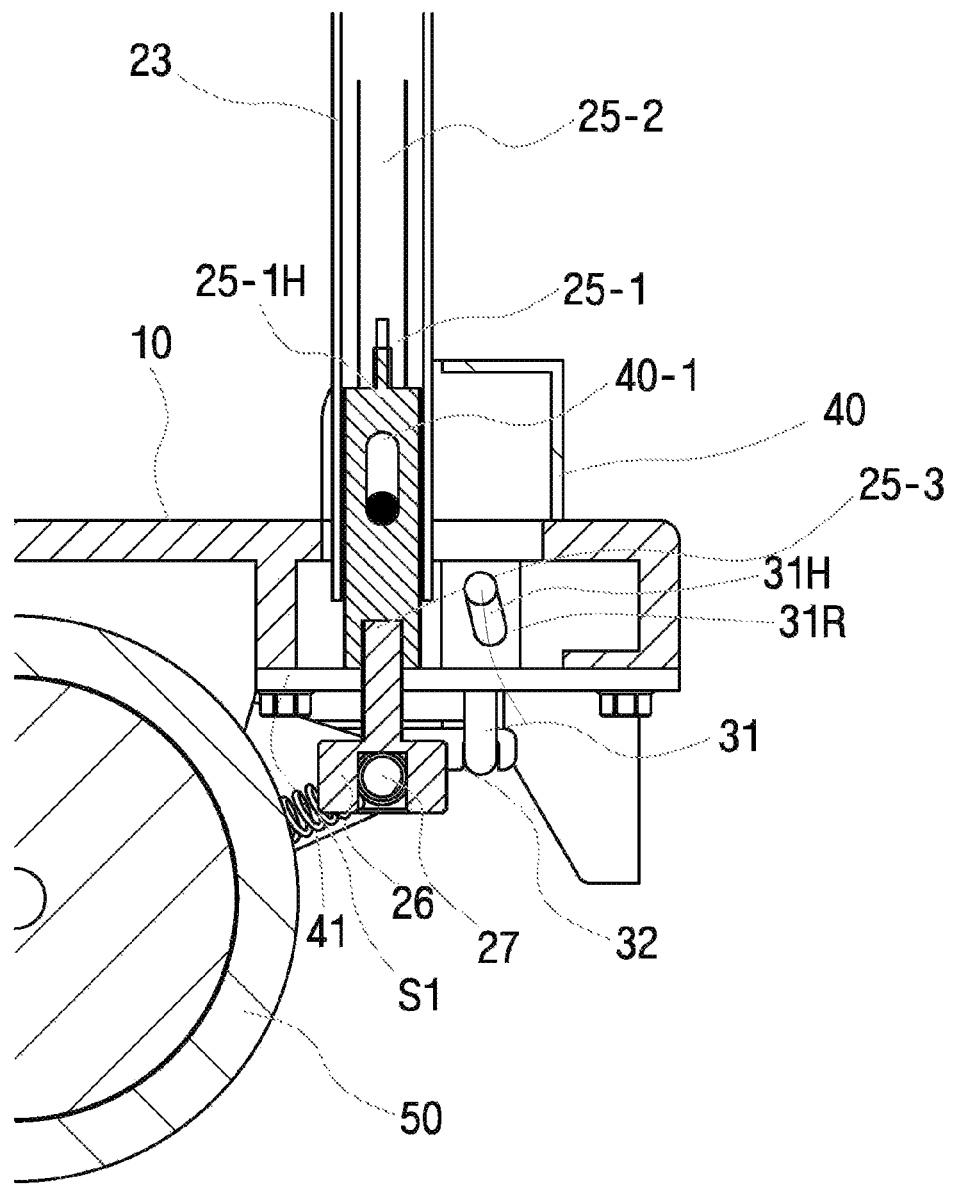
FIG. 8 is a cross-sectional view of the handle bar illustrating an operational state in FIG. 7.

FIG. 5 is a perspective view of the cart of FIG. 1 that is viewed at a slant from the bottom. FIG. 6 is an exploded perspective view of first and second operation parts of an operation part of a handle bar. FIG. 7 is a perspective view illustrating a state in which an inserting/withdrawing part has moved downward while the wheel locking and unlocking operation part is pressed, the perspective view showing a state in which a platform is removed from FIG. 5. FIG. 8 is a cross-sectional view of the handle bar illustrating an operational state in FIG. 7.

Referring to FIGS. 5 to 8, the platform 10 has a wheel 50 including therein a fixing piece 51 having a plurality of recessed grooves 51-1 formed along an inner circumference thereof and has freight loaded thereon.

Referring back to FIGS. 1 and 2, the handle bar 20 includes a "∩" shaped frame including a left frame 22, a right frame 23, and a connecting frame 21, of which rearward rotation is limited by a rearward rotation limiting part 40 provided at a rear side of an upper surface of the platform 10, a wheel locking and unlocking operation part 20b1 provided on the "∩" shaped frame and configured to be pressed and elastically restored, and an operation part configured to operate by an operation of the wheel locking and unlocking operation part 20b1. The wheel locking and unlocking operation part 20b1 is surrounded by a wheel locking and unlocking operation part cover 20b illustrated in FIG. 12 which will be described below and may be pressed by a user pressing the wheel locking and unlocking operation part cover 20b.

Referring to FIGS. 1 to 7, the folding operation part includes a pedal 30 provided at one end of the platform 10, a pedal connecting part 32 connected to the pedal 30 from a lower surface of the platform 10, and a folding operation rod 31 supported by the pedal connecting part 32 and configured to vertically move.

Figure 9:
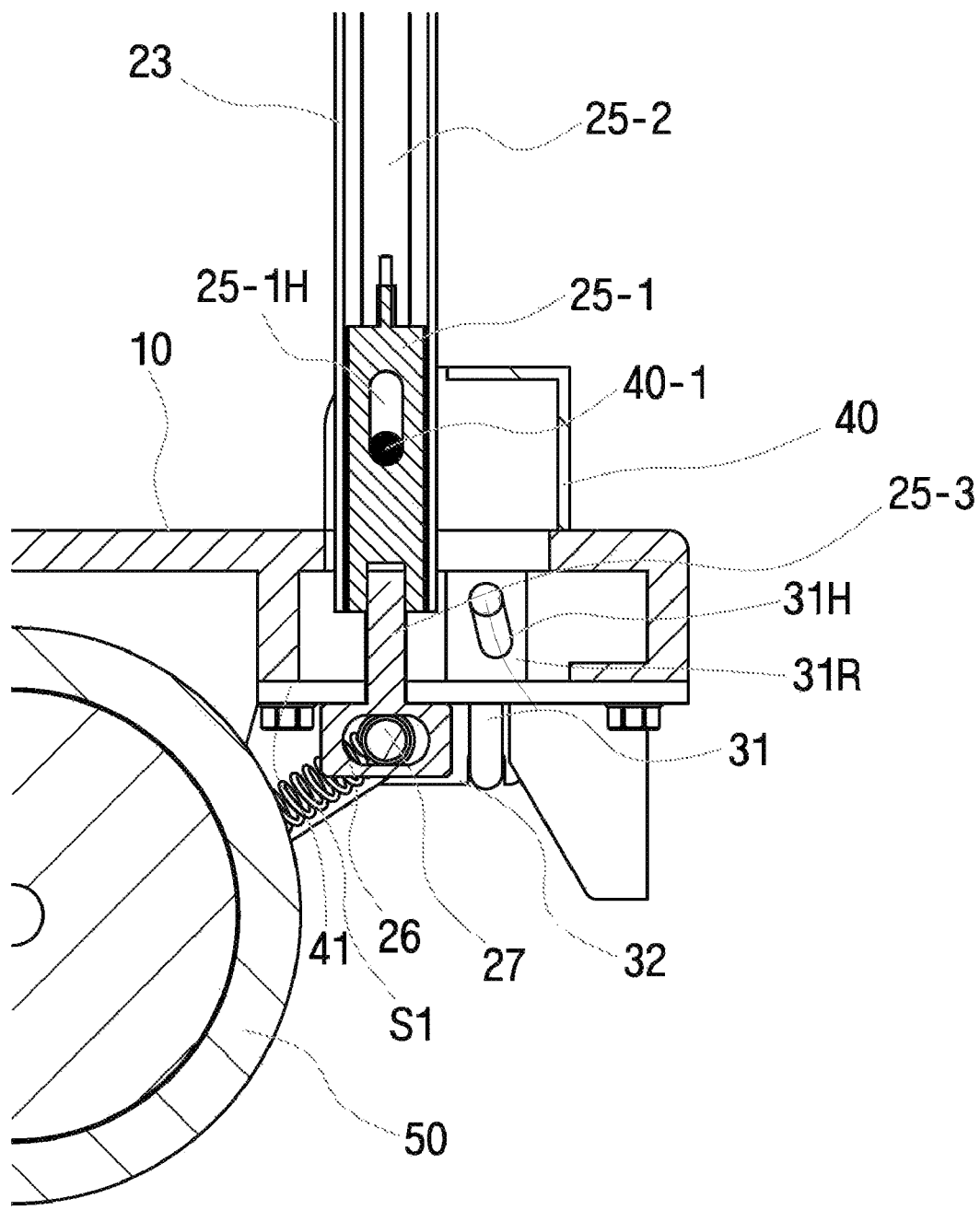
FIG. 9 is a cross-sectional view of the handle bar before the pedal is pressed while the wheel locking and unlocking operation part does not operate.
Figure 10:
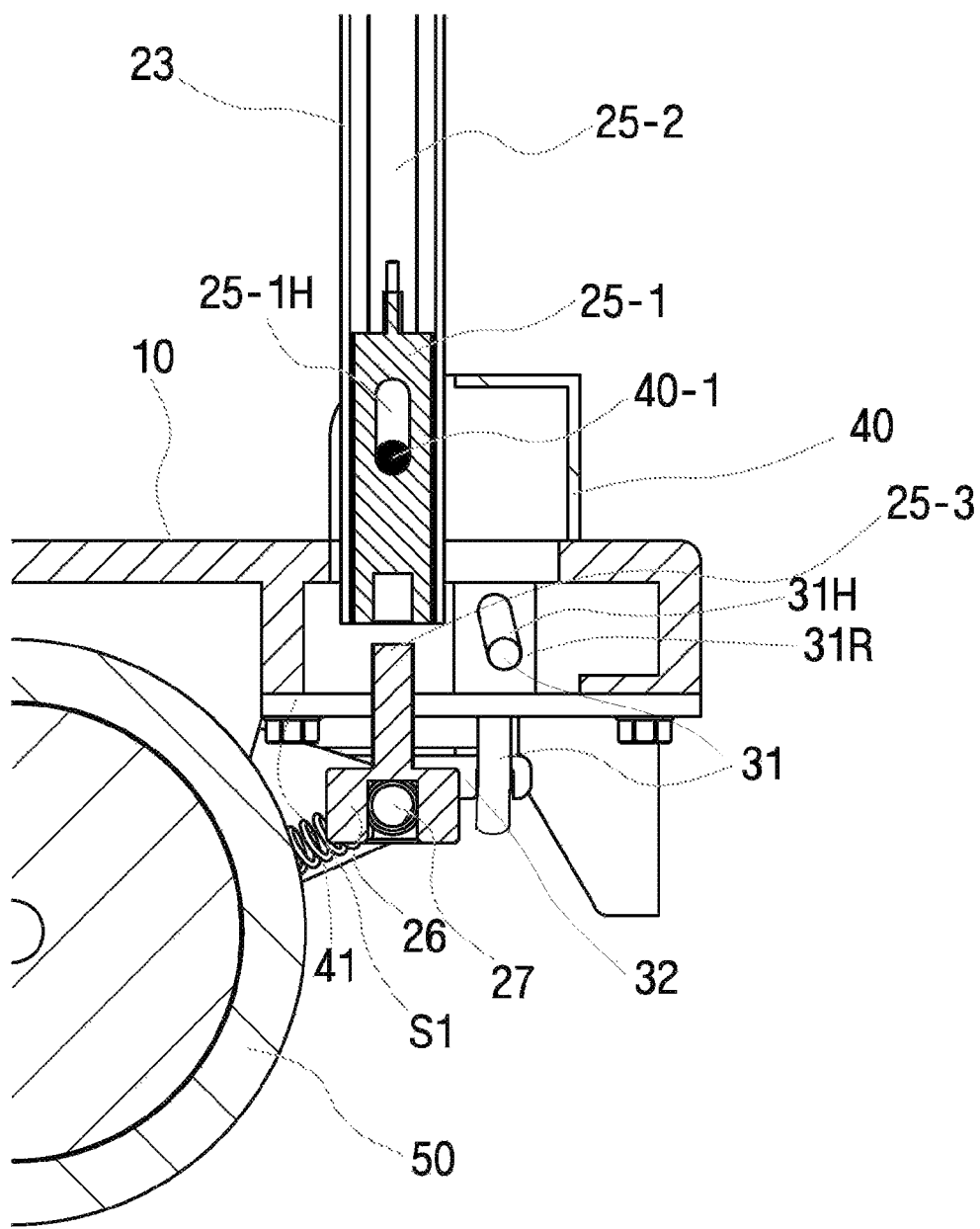
FIG. 10 is a cross-sectional view of the handle bar when the pedal is pressed while the wheel locking and unlocking operation part does not operate.
Figure 11:
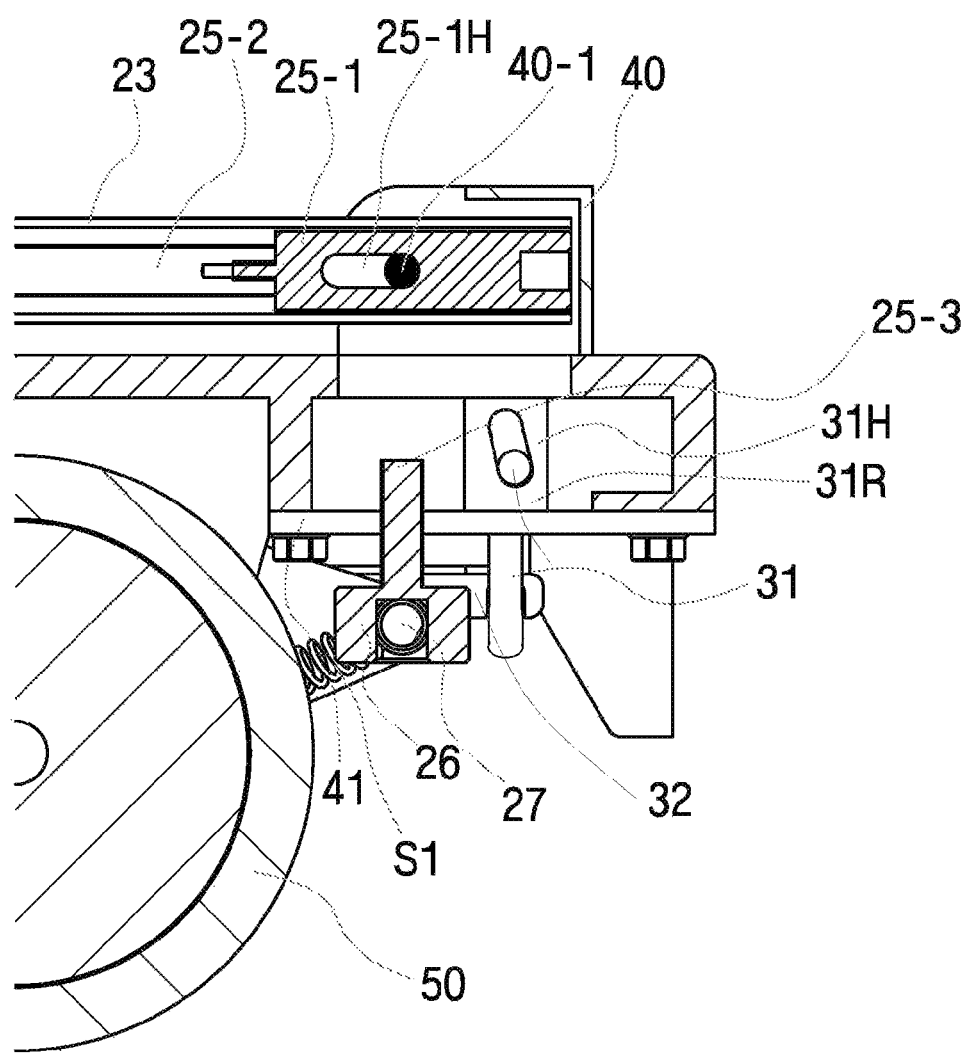
FIG. 11 is a cross-sectional view of the handle bar illustrating a state in which a handle is folded from the state in FIG. 9.

FIG. 9 is a cross-sectional view of the handle bar before the pedal is pressed while the wheel locking and unlocking operation part does not operate. FIG. 10 is a cross-sectional view of the handle bar when the pedal is pressed while the wheel locking and unlocking operation part does not operate. FIG. 11 is a cross-sectional view of the handle bar illustrating a state in which a handle is folded from the state in FIG. 9.

Referring to FIGS. 1 to 9, the operation part of the handle bar 20 includes a first operation part 25-2 disposed inside the left frame 22 and the right frame 23 and configured to vertically operate by an operation of pressing and releasing the wheel locking and unlocking operation part 20b1, a second operation part 25-1 coupled to a lower end of the first operation part 25-2 and having a recessed groove 25-1b formed at a lower end portion thereof, a third operation part 27 disposed at the lower surface of the platform 10 and configured to rotate or be elastically restored, in linkage with an operation of the second operation part 25-1, about a hinge hg provided at a rotary plate 28 provided at the lower surface of the platform 10, and a fourth operation part 29 connected to the third operation part 27 via the rotary plate 28 and configured to be inserted and withdrawn into and from one of the plurality of recessed grooves 51-1 of the wheel 50 to cause the wheel 50 to be locked and unlocked.

Here, the left frame 22 and the right frame 23 may be provided upward at an angle in the range of 100° to 110° with respect to the upper surface of the platform 10 while the pedal 30 does not operate. The left frame 22 and the right frame 23 may be provided upward at an angle of 105° with respect to the upper surface of the platform 10 while the pedal 30 does not operate. When the left frame 22 and the right frame 23 are provided at that angle, there is an advantageous effect in that, even when a user applies a small pushing force to the cart, a horizontal component force of the force pushing the cart becomes large, and thus the cart onto which goods are loaded may be moved even with a small force.

In addition, the second operation part 25-1 includes a through-slot 25-1H formed in an upper portion thereof, and a pin 40-1 passes through the through-slot 25-1H. According to such a configuration, there is an effect of limiting a downward moving distance when the second operation part 25-1 moves downward due to the operation of pressing the wheel locking and unlocking operation part 20b1. When the operation of pressing the wheel locking and unlocking operation part 20b1 is not performed, the second operation part 25-1 moves upward. In this case, the through-slot 25-1H also has an effect of limiting an upward moving distance of the second operation part 25-1.

Referring back to FIGS. 1 and 2, a connecting plate 24 connecting the left frame 22 and the right frame 23 is illustrated as being disposed below the connecting frame 21. The connecting frame 21 serves to prevent distortion or deformation of the left frame 22 and the right frame 23. At the same time, since the connecting frame 21 has a rectangular shape, it is possible to enhance an advertising effect or improve aesthetics by drawing a figure or writing a letter directly on the rectangular portion or attaching other media (e.g., stickers, leaflets, or the like) containing figures or letters. The connecting plate 24 may also be omitted in other embodiments.

As illustrated in FIGS. 1 to 6, the elastic restoration of the wheel locking and unlocking operation part 20b1 may be performed by a spring seating ring 23Rb fitted to inner sides of upper ends of the left frame 22 and the right frame 23 and a spring S2 provided between protrusions protruding downward from an inner surface of an upper end portion of the wheel locking and unlocking operation part 20b1. However, the present invention is not limited thereto, and the elastic restoration of the wheel locking and unlocking operation part 20b1 may also be performed using other elastic means, e.g., a magnetic force, a rubber, or the like, in other embodiments.

As illustrated in FIGS. 1 to 6, a spring 51 is provided between the fourth operation part 29 and the platform 10, and the elastic restoration of the third operation part 27 may be performed by the spring 51. However, the present invention is not limited thereto, and the elastic restoration of the third operation part 27 may also be performed using other elastic means, e.g., a magnetic force, a rubber, or the like, in other embodiments.

FIG. 10 is a cross-sectional view of the handle bar when the pedal is pressed while the wheel locking and unlocking operation part does not operate, and FIG. 11 is a cross-sectional view of the handle bar illustrating a state in which a handle is folded from the state in FIG. 9.

Referring to FIGS. 1 to 11, since the pedal connecting part 32 is connected to the pedal 30, the pedal connecting part 32 moves downward during the operation of pressing the pedal 30 and causes the folding operation rod 31 and the third operation part 27 to move downward. Accordingly, the third operation part 27 rotates about the hinge hg.

The third operation part 27 includes a fixing part 26 coupled and fixed to the third operation part 27 while surrounding the third operation part 27 in the vicinity of an end thereof, and an inserting/withdrawing part 25-3 connected to the fixing part 26 and configured to remain inserted into a recessed groove 25-1b of the second operation part 25-1 at ordinary times and be inserted and withdrawn into and from the recessed groove 25-1b of the second operation part 25-1 during the operation of pressing and releasing the pedal 30.

Here, an intermediate plate 41 is provided at the lower surface of the platform 10 at which the inserting/withdrawing part 25-3 is disposed. The fixing part 26 serves to securely fix the third operation part 27 and the inserting/withdrawing part 25-3 by welding while preventing the third operation part 27 from colliding with the intermediate plate 41.

Hereinafter, actions and effects while the wheel locking and unlocking operation part 20b1 is pressed and not pressed will be described.

Referring to FIGS. 1 to 11, when the user presses the wheel locking and unlocking operation part cover 20b from top to bottom, the wheel locking and unlocking operation part 20b1 is pressed downward, and accordingly, the first operation part 25-2 and the second operation part 25-1 illustrated in FIG. 8 move downward. Due to the downward movement of the second operation part 25-1, the inserting/withdrawing part 25-3 moves downward as illustrated in FIGS. 7 and 8, and accordingly, the fixing part 26 and the third operation part 27 move downward. Since the third operation part 27 is connected to the rotary plate 28 together with the fourth operation part 29, the rotary plate 28 rotates due to the downward movement of the third operation part 27, and accordingly, the fourth operation part 29 moves. As a result, the fourth operation part 29 moves by being guided along a slot 11-1 formed in a wheel shaft support plate 11 and is separated from a recessed groove 51-1 formed along the inner circumference of the fixing piece 51 disposed at the inner side of the wheel 50. In this way, the wheel is unlocked.

When the user does not press the wheel locking and unlocking operation part 20b1, the third operation part 27 moves upward due to the spring S1. In this case, the fourth operation part 29 is inserted into the recessed groove 51-1 such that the wheel is firmly locked, and the wheel locking and unlocking operation part 20b1 is also restored to its original upward position due to an elastic restoration force of the spring S2.

Hereinafter, a structure in which the handle bar 20 is folded due to the user stepping on the pedal 30 and a structure in which the handle bar 20 is returned to an unfolded state afterward will be described.

Referring to FIGS. 1 to 11, the inserting/withdrawing part 25-3 may be inserted into and withdrawn from the recessed groove 25-1b of the second operation part 25-1 during the operation of pressing and releasing the pedal 30. Specifically, when the user steps on the pedal 30 using his or her foot, due to the downward movement of the pedal 30, the pedal connecting part 32 connected to the pedal 30 moves downward and pushes the folding operation rod 31 and the third operation part 27 downward. In this way, while the folding operation rod 31 moves downward at a slant along a slot 31H in a folding operation rod support plate 31R, the inserting/withdrawing part 25-3 connected to the third operation part 27 via the fixing part 26 moves downward and may be separated from the recessed groove 25-1b of the second operation part 25-1. In this state, when the user holds and pushes the left frame 22 and the right frame 23 by hand, since the left frame 22 and the right frame 23 may be folded, the handle bar 20 may be folded to be parallel to the upper surface of the platform 10. Conversely, when the user holds the handle bar 20 by hand and rotates the handle bar 20 to the highest possible end while stepping on the pedal 30 and then removes his or her foot from the pedal 30, the third operation part 27 and the inserting/withdrawing part 25-3 connected to the third operation part 27 via the fixing part 26 simultaneously move upward due to the restoration force of the spring S1, and, due to a restoration force of a torsion spring S3, the folding operation rod 31 moves upward at a slant along the slot 31H in the folding operation rod support plate 31R. Accordingly, while the inserting/withdrawing part 25-3 is inserted into the recessed groove 25-1b of the second operation part 25-1, the handle bar 20 including the left frame 22 and the right frame 23 is restored to its original position at which the handle bar 20 is not folded. A spring S4 is provided between the third operation part 27 and the fourth operation part 29 to firmly connect the third operation part 27 and the fourth operation part 29.

In addition, when the user steps on the pedal 30, due to the operation of pressing the pedal 30, the pedal connecting part 32 connected to the pedal 30 and the folding operation rod 31 supported by the pedal connecting part 32 simultaneously move downward, and accordingly, the third operation part 27 rotates about the hinge hg provided at the rotary plate 28 fixed to the platform 10. Accordingly, the fourth operation part 29 also provided to pass through the rotary plate 28 rotates and is separated from the recessed groove 51-1 of the wheel 50. In this way, the wheel 50 may be unlocked, and, simultaneously, the inserting/withdrawing part 25-3 connected to the third operation part 27 via the fixing part 26 is separated from the recessed groove 25-1b such that the handle bar 20 may be folded. When the user removes his or her foot from the pedal 30, the pedal 30, the folding operation rod 31, and the extension 33 simultaneously move upward, and, accordingly, the third operation part 27 and the fourth operation part 29 rotate about the hinge hg such that the fourth operation part 29 is inserted into the recessed groove 51-1, causing the wheel 50 to be locked, and the inserting/withdrawing part 25-3 is inserted into the recessed groove 25-1b, causing the handle bar 20 to be fixed without being folded. According to such a configuration, by stepping on the pedal 30 and folding the handle bar 20, the user may move the cart using his or her foot without using his or her hand while goods are loaded on the cart.

Here, the pedal 30 is connected to the pedal connecting part 32 and may have a conventional structure in which, when a pressing force is received, the pedal 30 moves downward and causes the pedal connecting part 32 to move downward, and when the pressing force is released, the pedal 30 may be restored to its original position by a spring. Since such a structure is already known, detailed description thereof will be omitted.

Figure 12:
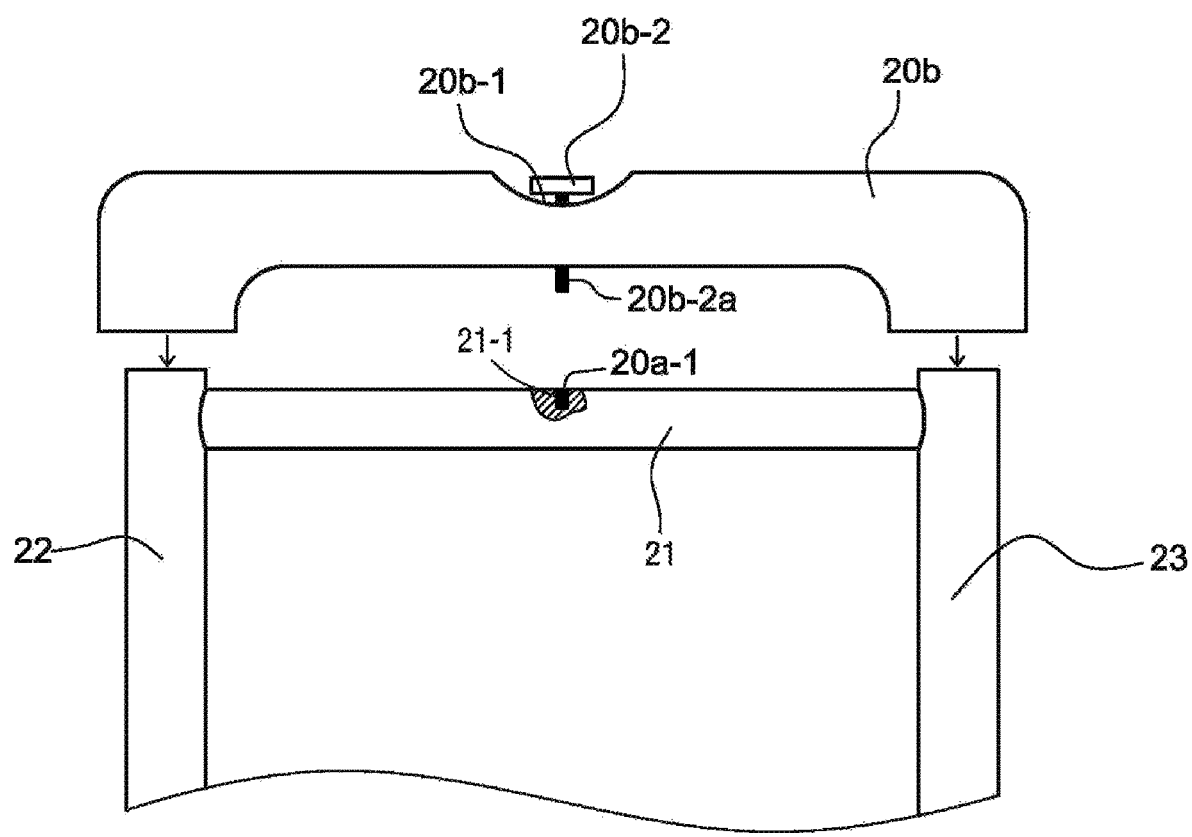
FIG. 12 is a view illustrating a wheel locked and unlocked state maintaining part for coupling between the handle bar and the wheel locking and unlocking operation part and for maintaining a locked state and an unlocked state of the wheel.
Figure 13:
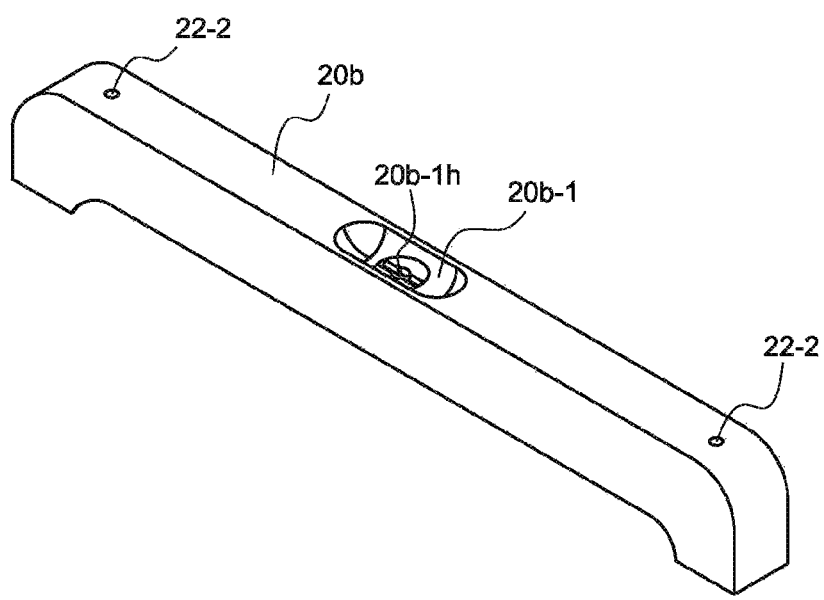
FIG. 13 is a perspective view of the wheel locking and unlocking operation part of FIG. 11 in a state in which the wheel locked and unlocked state maintaining part is removed.
Figure 14:
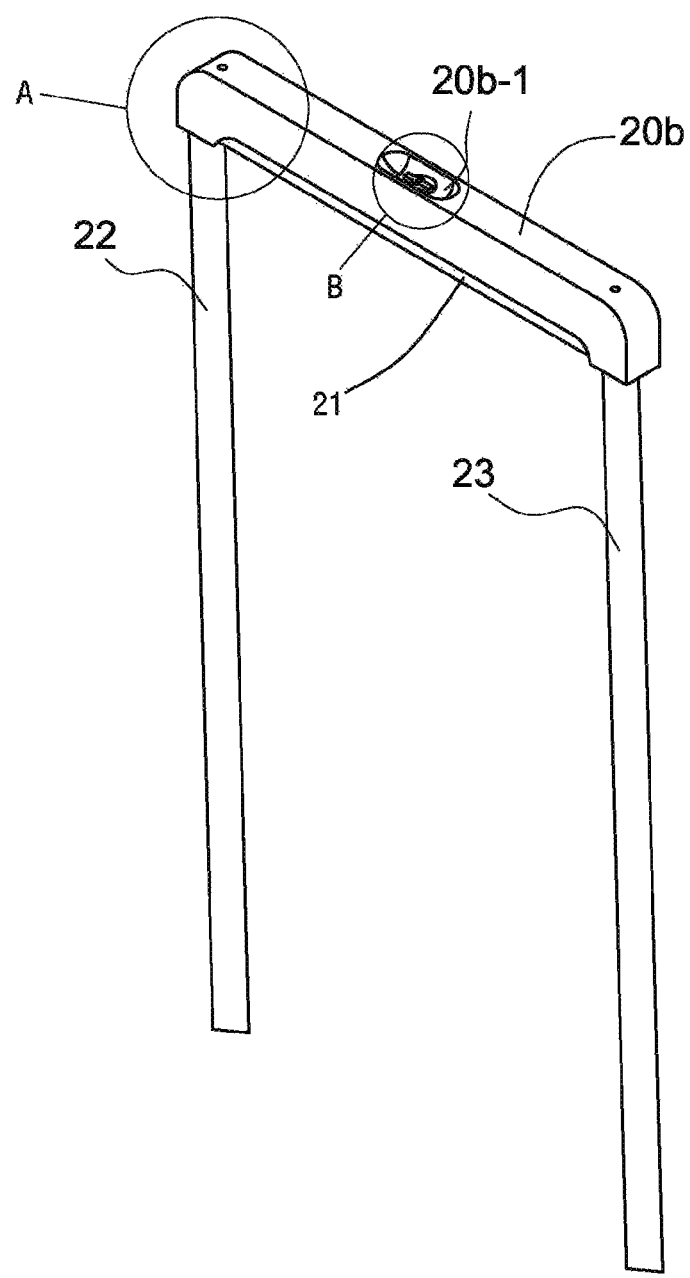
FIG. 14 is a perspective view of the handle bar.
Figure 15:
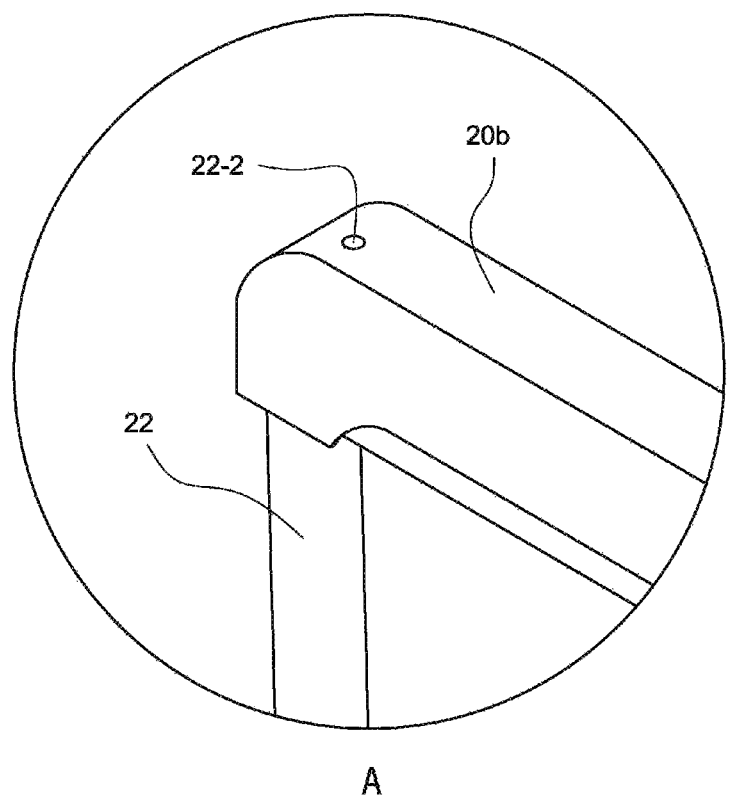
FIG. 15 is an enlarged perspective view of portion A in FIG. 14.
Figure 16:
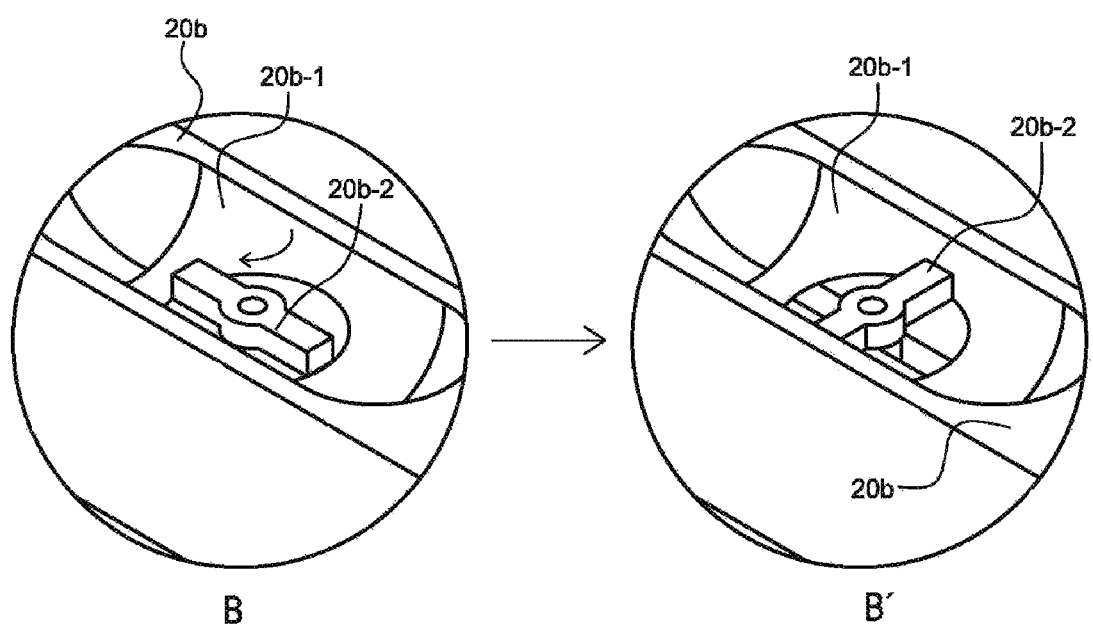
FIG. 16 is an enlarged perspective view of portion B in FIG. 14.

FIG. 12 is a view illustrating a wheel locked and unlocked state maintaining part for coupling between the handle bar and the wheel locking and unlocking operation part and for maintaining a locked state and an unlocked state of the wheel. FIG. 13 is a perspective view of the wheel locking and unlocking operation part of FIG. 11 in a state in which the wheel locked and unlocked state maintaining part is removed. FIG. 14 is a perspective view of the handle bar. FIG. 15 is an enlarged perspective view of portion A in FIG. 14. FIG. 16 is an enlarged perspective view of portion B in FIG. 14.

As seen in FIGS. 12 to 16, the wheel locking and unlocking operation part cover 20b includes a hole 22-2 formed at left and right ends, and by a bolt (not illustrated) being inserted into the hole 22-2, the wheel locking and unlocking operation part 20b is screw-coupled to the wheel locking and unlocking operation part 20b1 illustrated in FIG. 1 and the upper side of the first operation part 25-2. Also, the wheel locking and unlocking operation part cover 20b includes a concave recess 20b-1 formed at the center of an upper surface thereof, a key groove 20b-1h is formed at a bottom surface of the recess 20b-1, and a wheel locked and unlocked state maintaining part 20b-2 formed in a shape having a transverse cross-section corresponding to a transverse cross-section of the key groove 20b-1h is disposed at the bottom surface of the recess 20b-1.

The connecting frame 21 illustrated in FIG. 12 may have a screw groove 21-1 formed at the center thereof, the wheel locked and unlocked state maintaining part 20b-2 may have a bolt 20b-2a formed at a lower side thereof, and the bolt 20b-2a may pass through the hole 22-2 in the wheel locking and unlocking operation part 20b1 to be screw-fastened to the screw groove 21-1 and be released therefrom. The bolt 20b-2a is screw-fastened when the user holds and turns the wheel locked and unlocked state maintaining part 20b-2 so that the wheel locked and unlocked state maintaining part 20b-2 reaches a state of intersecting with the shape of the key groove 20b-1h as seen in the right drawing of FIG. 16. When the bolt 20b-2a is screw-fastened in this way, the wheel locked and unlocked state maintaining part 20b-2 may maintain the state of intersecting in a "+" shape with the shape of the key groove 20b-1h as seen in the right drawing of FIG. 16 so that the wheel remains unlocked even when the user does not press the wheel locking and unlocking operation part 20b1 from top to bottom. Conversely, when the user holds and turns the wheel locked and unlocked state maintaining part 20b-2 by hand so that the wheel locked and unlocked state maintaining part 20b-2 reaches a state of matching the shape of the key groove 20b-1h as seen in the left drawing of FIG. 16, the bolt 20b-2a is released. When the bolt 20b-2a is released in this way, the wheel locking and unlocking operation part 20b1 moves upward due to the elastic restoration force of the spring S2 and maintains the original interval from the connecting frame 21. In this case, the wheel 50 is locked, and the locked state thereof is maintained.

The cart with a wheel that is easily lockable and unlockable according to the present invention can achieve the following advantageous effects by the above.

First, there is an advantageous effect of providing a cart with a wheel that is easily lockable and unlockable in which the wheel of the cart is easily locked and unlocked while being securely braked.

Second, there is an advantageous effect of providing a cart with a wheel that is easily lockable and unlockable in which the cart may be used while the wheel of the cart is kept locked and unlocked when necessary.

Third, there is an advantageous effect of providing a cart with a wheel that is easily lockable and unlockable in which, even when a user applies a small pushing force to the cart, a horizontal component force of the force pushing the cart becomes large, and thus the cart onto which goods are loaded may be moved.

Fourth, there is an advantageous effect of providing a cart with a wheel that is easily lockable and unlockable in which, during tasks of unlocking a folded state of a handle and folding the handle, a hand and a foot are alternately used such that efficiency of the tasks is improved.

The present invention has been described above in detail using exemplary embodiments thereof. However, the scope of the present invention is not limited to specific embodiments and should be interpreted by the appended claims. Also, those of ordinary skill in the art should understand that various modifications and changes may be made without departing from the scope of the present invention.

What is claimed is:

1. A cart with a wheel that is easily lockable and unlockable, the cart comprising:
   a platform having the wheel including therein a fixing piece in which a plurality of recessed grooves are formed along an inner circumference thereon and on which freight is loadable;
   a handle bar including an inverted U shaped frame including a left frame, a right frame, and a connecting frame, of which rearward rotation is limited by a rearward rotation limiting part provided at a rear side of an upper surface of the platform, a wheel locking and unlocking operation part provided on the inverted U shaped frame and configured to be pressed and elastically restored, and an operation part configured to operate by an operation of the wheel locking and unlocking operation part; and
   a folding operation part including a pedal provided at one end of the platform, a pedal connecting part connected to the pedal from a lower surface of the platform, and a folding operation rod supported by the pedal connecting part and configured to vertically move,
   wherein the operation part of the handle bar includes:
   a first operation part disposed inside the left frame and the right frame and configured to vertically operate by an operation of pressing and releasing the wheel locking and unlocking operation part;
   a second operation part coupled to a lower end of the first operation part and having a recessed groove formed at a lower end portion thereof;
   a third operation part disposed at the lower surface of the platform and configured to rotate or be elastically restored, in linkage with an operation of the second operation part, about a hinge provided at a rotary plate provided at the lower surface of the platform; and
   a fourth operation part connected to the third operation part via the rotary plate and configured to be inserted and withdrawn into and from one of the plurality of recessed grooves of the wheel to cause the wheel to be locked and unlocked.

2. The cart of claim 1, wherein the left frame and the right frame are provided upward at an angle in a range of 100° to 110° with respect to the upper surface of the platform while the pedal does not operate.

3. The cart of claim 1, wherein the elastic restoration of the wheel locking and unlocking operation part is performed by a spring seating ring fitted to inner sides of upper ends of the left frame and the right frame and a spring provided between protrusions protruding downward from an inner surface of an upper end portion of the wheel locking and unlocking operation part.

4. The cart of claim 1, wherein:
   a spring is provided between the third operation part and the platform; and
   the elastic restoration of the third operation part is performed by the spring.

5. The cart of claim 1, comprising an extension connected to the pedal connecting part and disposed between the lower surface of the platform and the third operation part so that, while the pedal is pressed, the extension allows the third operation part to rotate about the hinge.

6. The cart of claim 1, wherein the third operation part includes a fixing part coupled and fixed to the third operation part while surrounding the third operation part at a portion of the third operation part intersecting with an extension of a lower side of the second operation part and includes an inserting/withdrawing part connected to the fixing part and configured to remain inserted into a recessed groove of the second operation part at ordinary times and be inserted and withdrawn into and from the recessed groove of the second operation part during the operation of pressing and releasing the pedal.

7. The cart of claim 1, wherein:
- a wheel locked and unlocked state maintaining part having a shape in which a concave recess is formed at the center of an upper surface thereof, a key groove is formed at a bottom surface of the recess, and a transverse cross-section corresponding to a transverse cross-section of the key groove is disposed at the bottom surface of the recess is disposed at the wheel locking and unlocking operation part;
- the connecting frame has a screw groove formed therein;
- the wheel locked and unlocked state maintaining part has a bolt formed at a lower side thereof; and
- the bolt passes through a hole in the wheel locking and unlocking operation part to be screw-fastened to the screw groove and is released therefrom.

* * * * *